Sept. 15, 1970         J. R. MELCHER         3,529,186
ELECTROHYDRODYNAMIC GENERATOR Filed March 11, 1968                    2 Sheets-Sheet 1

INVENTOR:
JAMES R. MELCHER
BY Robert Shaw
ATTORNEY

Sept. 15, 1970          J. R. MELCHER          3,529,186
ELECTROHYDRODYNAMIC GENERATOR
Filed March 11, 1968          2 Sheets-Sheet 2
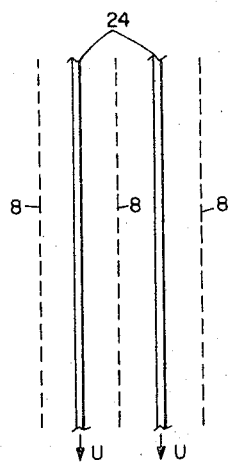
FIG. 4
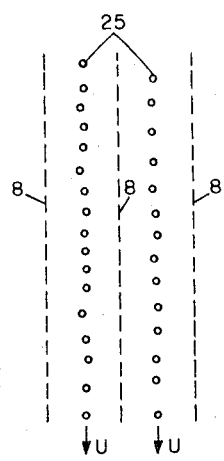
FIG. 5
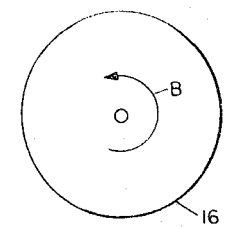
FIG. 6B
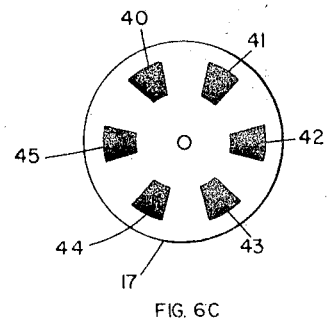
FIG. 6C
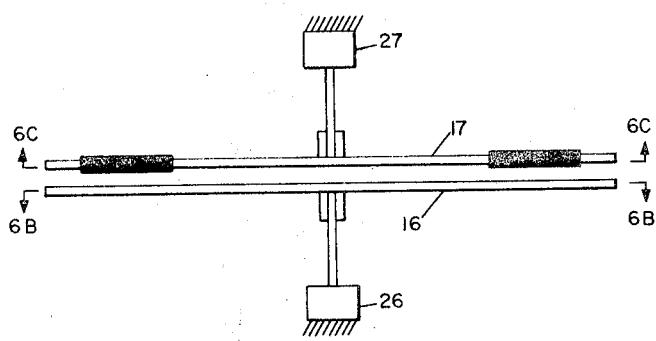
FIG. 6A
FIG. 6D
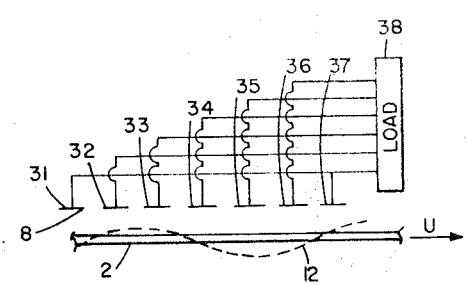
FIG. 7
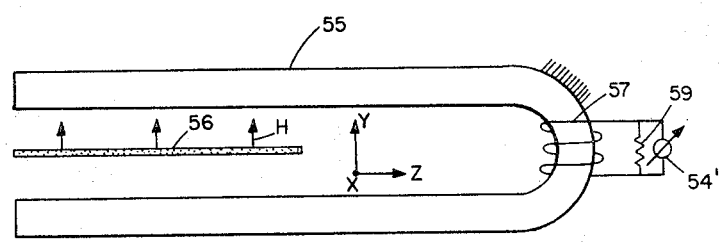
FIG. 9
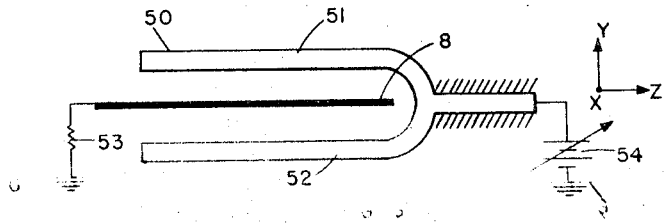
INVENTOR:
JAMES R. MELCHER
BY
ATTORNEY

United States Patent Office 3,529,186
Patented Sept. 15, 1970

3,529,186
ELECTROHYDRODYNAMIC GENERATOR
James R. Melcher, Lexington, Mass., assignor to Massachusetts Institute of Technology, Cambridge, Mass., a corporation of Massachusetts
Filed Mar. 11, 1968, Ser. No. 711,951
Int. Cl. H02n 1/12
U.S. Cl. 310—10
27 Claims

ABSTRACT OF THE DISCLOSURE

An electrohydrodynamic generator wherein an electric power output is effected by moving an electrically positively and negatively charged high-resistance belt or other medium relative to a plurality of electrodes thereby to charge the electrodes, by electrical inductive field effect, alternately positively and negatively. If the electrodes are connected to an inductive load and the value of inductance is properly chosen, the system can be made self-excited at a frequency related to the relative movement. A further facet disclosed is the provision of substantially large inductances or capacitances for loading the generator by a tuning fork or other electromechanical-elastic devices which may be coupled to the generator system, but which have other uses as well.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

In an application for Letters Patent entitled, "Electrohydrodynamic Apparatus and Method," S.N. 647,526, filed in the name of the present inventor on June 20, 1967 (now Pat. 3,463,944 dated Aug. 26, 1969), there is described an electroquasistatic traveling-wave apparatus adapted to perform a pump or generator function. In a further application entitled "Electrohydrodynamic Induction Flowmeter and Conductivity Measuring Device," S.N. 688,552, filed in the name of the present inventor on Dec. 6, 1967, there is described further electroquasistatic apparatus. The present invention relates, also, to electroquasistatic apparatus and particularly to an electroquasistatic generator in which, as is also the case of the apparatus of the previously-filed applications, an electric charge interaction is effected between electrodes and a high-resistance medium, but no mechanical (electrical) connection is effected between the two. That is, the electric field effect between the electrodes and charge accumulations in the high-resistance material provides the desired result, but there is no electric current flow between the two.

In the past few years there has been a concerted effort to combine the turbine and generator functions of conventional electric power-generating apparatus into one unit by using the moving gas or other fluid as the moving conductor in the generator. These magnetohydrodynamic (MHD) devices as presently developed generaly use gas as the prime mover and have been restricted to D–C devices, although self-excited A–C devices using liquid metals or liquid metal-gas systems have been built. The latter is not suited to synchronous operation, since it is not possible to obtain liquids of high enough conductivity. The apparatus herein described is electroquasistatic in that it is the effect of the electric field that is used to provide the desired result (whereas magnetic interactions predominate in MHD devices), and the apparatus is adapted to provide synchronous operation.

Accordingly, an object of the invention is to provide a synchronous charge-constrained electroquasistatic generator.

Another object is to provide a generator of a more general nature as well and one which may be excited by an external source of electric potential, but may also be self-excited.

A self-excited generator of the type herein disclosed requires an inductive load to become self-excited; still another object, therefore, is to provide a suitable device to provide such a load and to do so in a electroelastic device suitable for effecting substantially large inductive loading of the generator while nevertheless occupying relatively small volume.

A further object is to provide an elastic device of more general utility, as well, which can be used to provide either an inductive or capacitive load while occupying a relatively small volume.

Although the invention is described with principal reference to an insulating belt device of the Van de Graaf type, it has more general utility in that the high-resistance medium may be a liquid or a gas, or a combination thereof, or may be a disk or cylindrical high-resistance material, as hereinafter discussed; accordingly, a still further object is to provide a generator with more flexibility than is available in the magnetic field systems as typified by the MHD devices.

Other and still further objects are evident in the specification to follow and are particularly delineated in the appended claims.

By way of summary, one aspect of the objects hereof is attained in an electroquasistatic generator having an insulating medium or material with a source of electric potential adapted to establish positively and negatively charged regions in the medium. Pickup or output electrodes are positioned in zones to be affected by the fields of the charged regions but mechanically isolated therefrom. Relative movement is effected between the medium and the electrodes, the path of the movement being such that the positive and negative regions pass by the electrodes thereby inducing, respectively, negative and positive potentials in the electrodes. The output electrodes are adapted to be connected to a load to supply electric power to that load. Each of the electrodes is separated from an adjacent electrode by $1/n$ wavelengths (where $n$ is the number of phases), and, as is evident herein, many electrodes are connected in parallel to supply the large output power contemplated. In a polyphase system to which the described apparatus is well suited, each phase is made up of a plurality of such parallel-connected electrodes.

The invention will now be explained with reference to the accompanying drawings in which:

FIG. 4 shows a vertical fluid stream instead of the horizontal belt of FIG. 1;

FIG. 5 illustrates a series of droplets, as water or a solid material, in a gaseous insulating medium;

Figure 1:
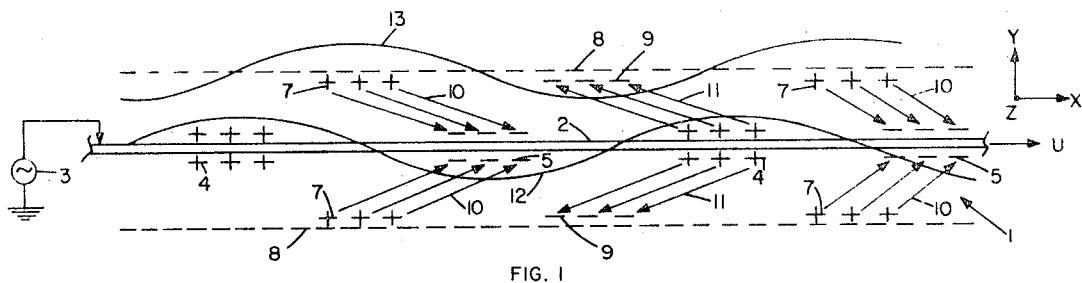
FIG. 1 is a schematic representation showing an electroquasistatic generator of the present invention in which a high-resistance medium, which might be a high-resistance belt, is shown disposed between two parallel electrode arrays.

FIG. 6A discloses a disk-shaped insulating medium and electrode arrangement;

FIG. 6B is a view taken upon the line 6B—6B in FIG. 6A looking in the direction of the arrows and shows in reduced size a plan view of the disk-shaped insulator of FIG. 6A;

FIG. 6C is a view taken upon the line 6C—6C in FIG. 6A looking in the direction of the arrows and shows in reduced size a plan view of the annular electrode arrangement of FIG. 6A;

FIG. 6D shows schematically apparatus for depositing charges upon the insulator of FIG. 6B;

FIG. 7 shows schematically a six-phase generator, as, for example, the generator illustrated in FIG. 1, connected to a load;

FIG. 8 shows a tuning fork which may be connected to provide inductive loading to the circuit of FIG. 7; and FIG. 9 is a modification of the tuning fork disclosed in FIG. 8 to provide a capacitive load for a magnetic field device.

Figure 2:
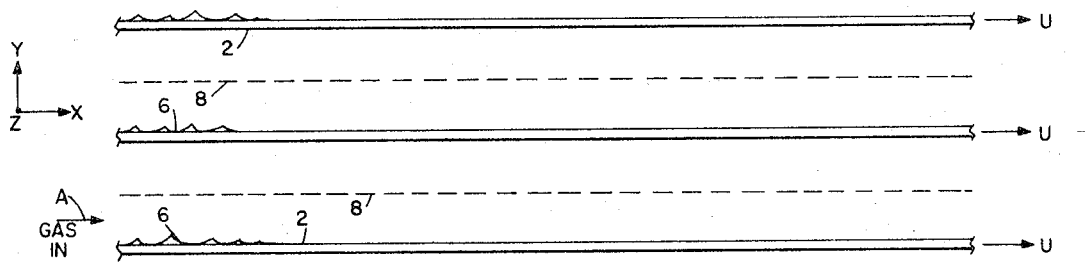
FIG. 2 is a schematic representation similar to FIG. 1 except that three belts are shown and with two electrode arrays.

Referring to FIG. 1 an electroquasistatic generator is shown generally at 1 having an insulating medium 2 which may be a Van de Graaf-type insulating belt. A source of electric potential, as the schematically represented A-C source shown at 3, is adapted to establish positive regions 4 and negative regions 5 upon the belt 2 as the belt moves relative thereto at some velocity U in the $x$ direction in response to a force which may be exerted by a gas introduced to travel in the direction of the arrow shown at A in FIG. 2 and to exert a force in the $x$ direction upon projections 6 on the insulating belts 2. A plurality of pickup or output electrodes 8 is positioned adjacent to the belt 2 to be sensitive to the electric field effect of the positive and negative regions, but is mechanically isolated therefrom, as shown. In FIG. 1 the spatial distribution of charges is sinusoidal in the $x$ direction as represented by the sinusoid 12. The charge accumulations, represented by the positive and negative designations 4 and 5, respectively, induce upon the electrodes 8 by the electric field effect of such accumulations (represented by the arrows 11 and 10, respectively) charges 9 and 7, respectively, of opposite polarities to the inducing charges. The induced charges 7 and 9 lag the respective inducing charges by some amount depending upon the connected load. As the belt 2 moves in the $x$ direction at some velocity U, the voltage induced on the individual electrode segments 8 varies sinusoidally as represented by the curve shown at 13. Further, each electrode has a dimension in the $x$ direction that is small compared to the wavelength of the applied potential thereby to provide an output in the form of a finite number of phases. (The term "finite" is intended here to denote apparatus with a limited or integral number of phases, as the six-phase embodiment of FIG. 7, hereinafter discussed. However, apparatus with thirty-six-phase groups is in some respects more desirable because of the lower voltage differential between adjacent electrodes 8; and the thirty-six phases can be combined through capacitors or transformers to provide three-phase output.) Because the belt 2 is a high-resistance material, the charges deposited thereupon are constrained to remain where deposited, and in the closed loop configuration shown in FIG. 3, for example, it is necessary that make-up charges only be deposited thereupon. Furthermore, the path along which the belt moves relative to the electrode segments is such that the electrodes are subjected alternately to positive and negative potential as the belt moves herealong. Unlike variable capacitance generators which are voltage constrained, the charge constrained generators herein disclosed are suitable for providing sinusoidal distribution of potential to the electrodes 8 without the requirement for motion of charge carriers relative to the moving media.

The source of A-C electric potential 3 is connected to introduce the sinusoidal space-charge distribution 12 along the belt 2 as the belt moves in the $x$ direction. Since the resistance of the belt is substantially infinite in the time relationship involved in the present apparatus, the charge is constrained to remain where deposited or induced, and the generator is adapted to provide essentially synchronous output power. The representations in FIGS. 1 and 2 can be considered to be a part of the apparatus shown in FIG. 3, where a plurality of nested closed-loop belts 2 is shown, each belt being adapted to travel in a path having two arcuate portions 20 and 20' and two straight-line or linear portions 21 and 21'. Electrodes 8 are positioned parallel to each straight-line portion of the belt. The belts may be driven by gas, as previously discussed, or by a turbine or some other prime mover 22 through a coupling mechanism 23 to travel in the closed-loop path. The source of A-C electric potential 3 may be located to deposit charges upon the belts 2 at the arcuate portions 20–20' in a sinusoidal spatial distribution as the belts travel past the source thereby to establish the sinusoidal distribution 12 previously discussed in connection with FIG. 1. The source 3 may be a corona source or it may be, also, an induction means. It is, of course, assumed that the frequency of the source and velocity of the belts are so adjusted that the total closed-loop belt length is a multiple of the wavelength $\lambda$, where $\lambda = 2\pi/k$ ($k$ is the wavenumber), and the appropriate values of the various parameters are chosen to provide the desired frequency output from the generator. The electrodes 8 need be positioned close enough to the belt so the charge regions on the belt will induce charges upon the electrode surface. The proximity of the electrodes to the belts will be governed also by discharges which might occur therebetween and this, in turn, will depend upon the gas and pressure of the gas in the gap, but the electric field density E is generally restricted by breakdown to be less than $10_7$ volts/meter.

Figure 3:
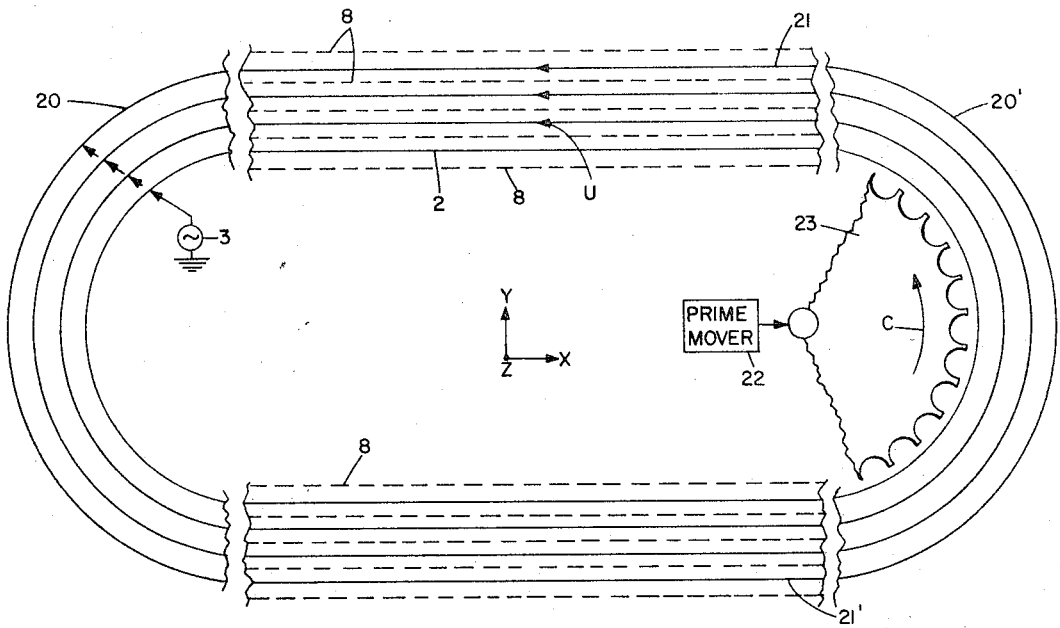
FIG. 3 shows a plurality of endless nested belts with electrode arrays therebetween.

The apparatus disclosed in FIG. 3 is particularly attractive for polyphase output. Although three-phase systems can be constructed, because of the substantial voltage that appears between adjacent electrodes 8 of such systems, the six-phase arrangement of FIG. 7 is preferable. In FIG. 7 six adjacent electrodes 8, numbered 31 through 36, are considered to form a group, and electrode 37 is considered the first of another group. The groups are paralleled by connecting electrodes of one group to the corresponding electrodes (electrodes having the same spatial position relative to the charges on the belt 2, as represented by the sinusoid 12) of another group; for example, electrode 31 is paralleled with electrode 37. Each six-electrode group spans one wave-length $\lambda$ ($2\pi$ electrical radians) and adjacent electrodes are ⅙ ($1/n$) wavelengths ($2\pi/6$ electrical radians) apart—center-to-center—just as are the windings of rotary generators of conventional design. Furthermore, electrodes adjacent to one belt 2 can be connected in parallel with electrodes adjacent to another belt 2 as long as the electrical phase-relationship of one is the same as that of the other. The representations in the figures are schematic in form and the electrodes 8 thereshown as short straight lines can be taken as end views of planar electrodes, rectangular in plan view and having a length much longer than the end view shown in the figures. In FIG. 7 the electrodes 31 to 37 are shown each having a width of about ⅙λ, which, for present purposes, is considered small compared to wavelengths of the applied potential.

The method whereby energy from the moving belt 2 is imparted to the electrodes 8 can best be understood with reference to FIG. 1, where the arrows 10 and 11 can be considered force vectors. Since the charges at the regions 4 and 5 are constrained, the traveling waves 12 and 13 have a fixed spatial relation to one another, and, as shown, the wave 13 lags the wave 12. Because of the phase displacement between the two waves, there is electric traction from the load, tending to retard the motion of the charge sheet on the belt, and hence a steady conversion of energy from the mechanical input of the prime mover to electrical energy dissipation, as in the load 38 in FIG. 7. At any position along the segmented electrodes 8, the potential varies at a frequency $\omega/2\pi$ with a peak value that is independent of the $x$ position. Of course, because of the traveling-wave nature of the interactions, the phase of the output potential does vary with x, and this must be taken into account when paralleling the electrodes of one phase group with corresponding electrodes of another phase group, as previously mentioned. It is particularly important to note that the charges at the regions 4 and 5 do not pass to the electrodes 8 (only the field effect of the charges is sensed by the electrodes at zones 7 and 9 to create an A-C output potential); so the corona source 3 needs only provide enough charge to replenish that charge only which has leaked or otherwise been dissipated from the regions 4 and 5. Thus, the charge transfer from the source 3 to the belts is not a primary limitation on the electric current capability of the generator.

It is possible to construct a synchronous A-C generator in which a plurality of nested belts is used, with the parallel-connections discussed herein, to provide the necessary high current capacities. The apparatus may be used to provide outputs of up to 1,000 kv., and the limit on the output power available is set only by volume, insulation strength, and flow velocity. Although the generator is larger in volume than electromagnetic conventional devices, it is lighter for a given output, which makes it desirable for some space applications. In practice belt velocities of 6,000 ft./min. and electric fields normal to the belt 2 of $10^6$ volts/meter in air at atmosphere pressure and $10^7$ volts/meter in 27 atmospheres of nitrogen as the insulating gas may be used. Characteristic parameters of the generator are U=30 meters/sec.; length and width of the belt at the linear portion, 30 meters and 10 meters, respectively, for the outside belt of a one hundred-belt system; $f=60$ Hz.; $\lambda=0.5$ meter and $$d=1/k=\lambda/2\pi=0.08$$

meter. The power output possible in a one hundred-belt system is $\frac{1}{4} \times 10^6$ watts in air at atmospheric pressure or $1.4 \times 10^8$ watts in nitrogen at 27 atmospheres. Thus, large power blocks are available at voltages high enough to obviate step-up transformers.

The previous description herein has related to apparatus wherein the insulating medium is a highly-insulating belt. The present invention is useful, however, with other insulating media or materials, as well. For example, the belt 2 can be replaced by a liquid stream 24 in FIG. 4 or an aerosol comprising particles 25 in an insulating gas, as air, helium, nitrogen, or the like, in FIG. 5. Either the liquid or the particles may be charged by a corona source, as previously discussed. The liquid in the stream 24 can be a transformer oil or similar material; the particles 25 can be tap water, in which case, head pressure of the water can replace the prime mover. However, in any event, the embodiments of FIGS. 4 and 5, although current-constrained, can have appreciable loss of charge from the charged regions since the charged particles can migrate from a fixed relative position due, for example, to attraction, repulsion, and turbulent diffusion. Thus, the fixed phase relationship between the inducing wave 12 and the induced wave 13 discussed in connection with the embodiment of FIG. 1, is not easily maintained using the embodiment of FIGS. 4 and 5. Although the insulating material discussed herein must have very high insulating properties, it must, particularly for purposes hereinafter discussed in connection with self-excitation, have some slight conductivity to allow charges to relax to the regions 4 and 5.

The embodiment of FIGS. 6A, 6B, 6C, and 6D comprises two rotatable juxtaposed disks 16 and 17, either of which may be made to rotate relative to the other by the use of drives 26 and 27, respectively. In the present discussion it will be assumed that the disk 16 is rotatable in the direction of the arrow shown at B and that the disk 17 is stationary. As the disk 16 rotates, charges are deposited from the source 3 through charge sources 3' upon the face of the disk 16 nearest the disk 17. Electrodes 40 through 45 on the disk 17 serve as one electrode group (as do the electrodes 31 to 36 in FIG. 7) for a six-phase machine, although three-phase or other polyphase units can be made, as before. Although one wavelength of charges is assumed to be deposited on the inside face of the disk 16 in the present discussion, two or more wavelengths can be deposited, in which event, the number of electrode groups on the inner face of the disk 17 will be increased to equal the number of wavelengths, from the number shown. In addition, a plurality of the disks shown at 16 and 17 can be connected in parallel to provide sufficient current for particular purposes. The material of which the disks 16 and 17 are made may be Plexiglas or some other insulator.

In the apparatus previously described herein, a charge accumulation has been induced or deposited upon the belt 2 or other high-resistance medium by a source of potential. It is possible, however, to provide conditions where self-excitation takes place, and, for present purposes, it has been found that an appropriate inductive load 38 is required. The problem of obtaining the required relatively large inductors, however, usually takes on impractical proportions. It is proposed, therefore, to provide the required inductance by electroelastic means. In a preferred embodiment the electroelastic structure is shown at 50 in FIG. 8 as a tuning fork in which the lowest mode thereof comprises a parallel plate capacitor system consisting of tines 51 and 52 which act as equipotential plates in face-to-face relationship with an intermediate plate which can be the electrodes 8 of the previously discussed systems. The thickness of the fork 50 into the paper in the figure should be of the order of the x dimension of the electrodes 8 as previously discussed, and there would be provided a plurality of such tuning forks distributed along the x direction. A variable D-C bias source 54, connected between the fork 50 and ground G serves to charge the fork 50 (and by induction the electrode 8) to provide a bias force tending to cause the tines 51 and 52 to move toward the electrode 8. The tuning fork 50 is made of steel or some other conductive resilient material. A generator embodying the present concept as, for example, that illustrated in FIG. 1, can have its output electrodes 8 at the far ends of each said output electrode interleaved between the tuning fork tines 51 and 52, the electrodes being connected to a load 53. Assuming that the constants of the generator and the tuning fork 50 are such that the generator can be made to self excite, the output of the variable D-C source 54 can be varied to some value at which oscillation will occur; that is, the bias can be established at a level at which interaction between the tuning fork and the electric generator results in resonance of the tuning fork structure at the natural resonance frequency of the generator.

The electroelastic structure shown in FIG. 8 provides an inductance load. There are, however, situations where capacitance loading is required to provide self-excitation, and, in this connection, the magnetoelastic structure shown at 55 in FIG. 9 is particularly useful because of the substantially large capacitance available in a relatively small volume. For example, assume 56 in FIG. 9 represents an MHD gas flowing out of the paper and subjected to a transverse magnetic field represented by H effected by the magnetizable and electrically insulating tuning fork 55. A variable D-C source 54' is coupled to the tuning fork through windings 57 to bias the mechanical tuning fork structure to some appropriate value of magnetic field. At the appropriate value, due to interaction between the MHD gas and magnetoelastic vibrations of the tuning fork, as the free ends of the tuning fork approach and move away from each other, an oscillatory condition or resonance will occur by self-excitation. The technique is applicable both to rotating machines, where the conductor is a rotating disk or shell, and to MHD devices, where the moving conductor is a liquid metal, a two-phase liquid-metal gas system, or a moving plasma. If in the diagram of FIG. 9 the velocity vector U is into or out of the paper in the $x$ direction, an A-C output can be taken from output coil 57 across a load resistor 59. The coil 57 can be distributed in any number of phases with wavelengths determined by the wavelength for self-excitation. The mathematics of the system shows that the self-excitation occurs at a wavelength or frequency which is controlled largely by the frequency of the tuned magnetoelastic system comprising the elastic structure 55 and related electrical circuitry. As before, a plurality of the tuning forks 55 are distributed along the $x$ direction, each of the forks having a dimension in the $x$ direction that is short compared to the wavelength of self-excited resonance frequency.

Modifications of the invention herein disclosed will occur to those skilled in the art and all such modifications are considered to fall within the spirit and scope of the invention as defined in the appended claims.

What is claimed is:

1. An electroquasistatic generator comprising, in combination, an insulating medium, a source of electric potential adapted to establish positive and negative regions in the insulating medium, pickup means positioned to be sensitive to the electric field effect of the positive and negative regions but mechanically isolated therefrom, means for establishing relative movement between the insulating medium and the pickup means, the path of relative movement between the two being such that the pickup means is subjected alternately to positive and negative electric potential during said relative movement.

2. An electroquasistatic generator as claimed in claim 1 and in which the pickup means comprises a plurality of electrodes disposed along said path, each electrode having a dimension in the direction of the path that is small compared to the wavelength of the applied potential thereby to provide an output in the form of a finite number of phases.

3. Apparatus as claimed in claim 2 comprising a synchronous charge-constrained electroquasistatic generator in which the insulating medium is an insulating belt.

4. An electroquasistatic generator as claimed in claim 3 in which the belt is the moving element and the electrodes and the source are stationary in space, and the source is a corona source.

5. Apparatus as claimed in claim 2 and in which the medium is an aerosol comprising a gas and discrete particles.

6. Apparatus as claimed in claim 5 and in which the particles are water droplets.

7. Apparatus as claimed in claim 5 and in which the particles are solid matter.

8. Apparatus as claimed in claim 2 in which the medium comprises a liquid stream.

9. Apparatus as claimed in claim 2 and in which the medium is a rotatable disk.

10. Apparatus as claimed in claim 2 and in which the electrodes are connected to ground through an inductive reactance.

11. Apparatus as claimed in claim 10 and in which the inductive reactance is an electroelastic structure.

12. Apparatus as claimed in claim 11 and in which the electroelastic structure is a tuning fork in which a natural mode is coupled by an electric field to the load.

13. An electroelastic structure for use as a part of the load of an electric generator having a moving electromagnetic media, that comprises, elastic mechanical means adapted to couple electromagnetically to the generator, the coupling being adapted to effect an electro-mechanical traveling-wave interaction between the mechanical means and the moving media of the generator.

14. Apparatus as claimed in claim 13 and in which the mechanical means comprises a plurality of tuning forks in which a traveling wave moving from fork to fork is coupled to the generator by a parallel plate capacitor system.

15. Apparatus as claimed in claim 14 in which the capacitor system associated with each of the tuning forks comprises two plates disposed in face-to-face relationship in two parallel planes and a source of D-C potential connected between the plates, the magnitude of the D-C potential plus the generator constants in combination with the elastic properties of the structure determining the frequency at which the forks will resonate, the combination adding an inductive component to the generator load.

16. Apparatus as claimed in claim 13 in which the structure is a magnetoelastic structure adapted to couple magnetically to moving media of the generator thereby to provide interaction between a magnetic field supplied by the magnetoelastic structure and a magnetic field in the media.

17. A method of generating electric potential, that comprises, creating a plurality of regions of positive and negative electric potential, creating relative motion between the regions and zones at which the electric field effect of the regions is sensed, said regions being mechanically isolated from said zones, the electric potential at such zones alternating from positive to negative electric potential by virtue of said relative motion, and connecting the zones to an inductive load, the magnitude of the inductance being established at a level at which resonance occurs because of the electric field interaction between said regions and said zones.

18. Apparatus for generating electric potential, that comprises, a high-resistance medium, means for creating a plurality of positive and negative electric potential regions in the medium, pickup means positioned to be sensitive to the electric field effect of the positive and negative regions but mechanically isolated therefrom, the medium and the pickup means in combination being adapted to move relative to each other, the path of relative movement between the two being such that the pickup means is subjected alternately to positive and negative electric potential during such movement, a load connected to the pickup means, the load being inductive and having an inductive reactance that is sufficient to cause the generator to become self-excited.

19. Apparatus as claimed in claim 18 comprising a synchronous charge-constrained electroquasistatic generator in which the high-resistance medium is an insulating belt.

20. A synchronous charge-constrained electroquasistatic generator comprising, in combination, a closed-loop insulating belt adapted to travel in a path having two arcuate portions and two linear portions, a source of electric potential adapted to establish positive and negative regions along the belt, a plurality of electrodes adjacently disposed in a plane substantially parallel to the linear portions to be sensitive to the electric field effect of the positive and negative regions but mechanically isolated therefrom, the electrodes being subjected alternately to positive and negative potential as the belt travels in the closed-loop path.

21. Apparatus as claimed in claim 20 in which the source is an A-C source adapted to create electric charge accumulations upon the belt at said regions in a sinusoidal spatial distribution along the belt, and the length of the belt loop is an integral number of wavelengths of the electric potential at said regions.

22. Apparatus as claimed in claim 21 in which each electrode has a dimension along the direction of travel of the linear portions that is small compared to the wavelength of the applied potential thereby to provide an output in the form of a finite number of phases.

23. Apparatus as claimed in claim 22 in which a plurality of adjacent electrodes form an electrode group, each electrode group being one wavelength long in said direction, and in which the electrodes of one group are interconnected with corresponding electrodes of other groups thereby to provide large power output.

24. Apparatus as claimed in claim 23 in which each group comprises six electrodes to provide a six-phase output, and a plurality of groups is provided, electrodes from one group being connected in parallel with corresponding electrodes in another group.

25. Apparatus as claimed in claim 21 in which a plurality of nested belts is provided, each belt differing in length by two wavelengths from the adjacent belts, and in which electrodes are positioned parallel to each linear portion of each belt.

26. Apparatus as claimed in claim 25 in which drive means is provided to drive the belts around the closed-loop path.

27. An electrohydrodynamic traveling wave generator that comprises, in combination a plurality of output electrodes disposed along one direction, means for propelling particles along a path adjacent to the electrodes and oriented in said direction, means for electrically charging the particles in a predetermined pattern, the path being close enough to the electrodes to enable the electric field of the charged particles to induce charges in the electrodes but mechanically isolated therefrom.

References Cited
UNITED STATES PATENTS

| | | | |
|---|---|---|---|
| 3,256,450 | 6/1966 | Gartner | 310—6 |
| 3,351,933 | 11/1967 | Maltby et al. | 310—25 |
| 3,392,292 | 6/1968 | Feinstein | 310—11 |

DAVID X. SLINEY, Primary Examiner

U.S. Cl. X.R.

310—6